Figure 1:
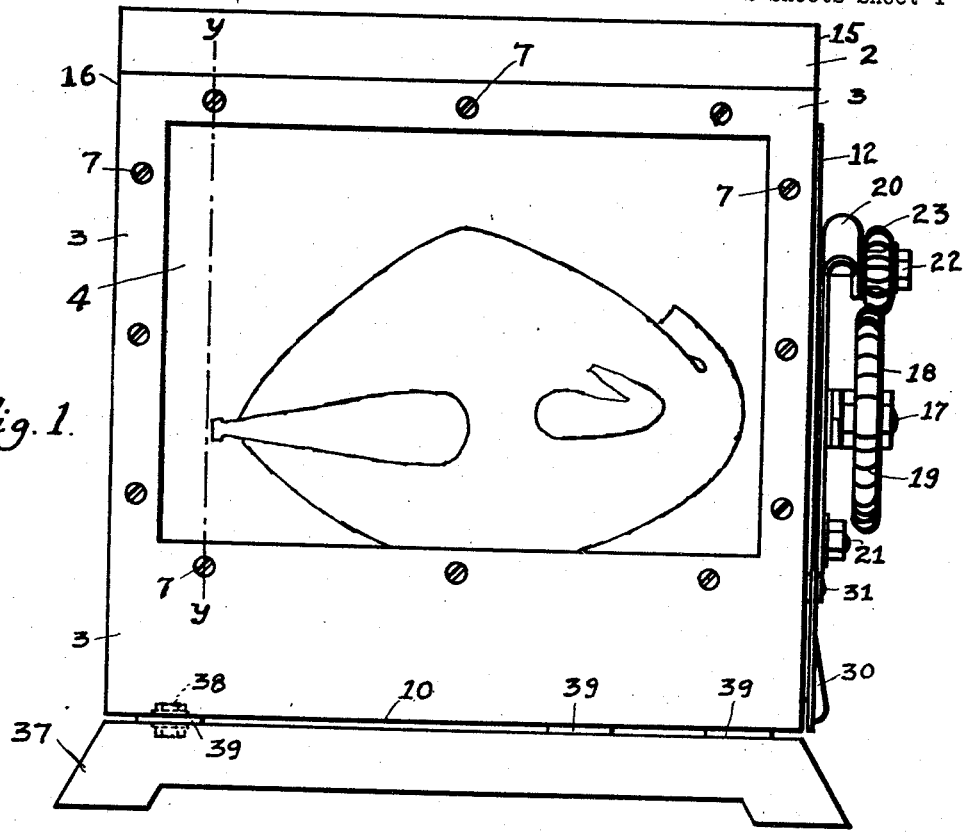

Nov. 12, 1935.  W. G. SPEAKMAN  2,020,807
ELECTRIC ROTISSERIE
Filed May 19, 1932  2 Sheets-Sheet 1

INVENTOR
William G. Speakman
Benjamin Webster
ATTORNEY

Nov. 12, 1935.  W. G. SPEAKMAN  2,020,807
ELECTRIC ROTISSERIE
Filed May 19, 1932  2 Sheets-Sheet 2

INVENTOR
William G. Speakman
BY Benjamin Webster
ATTORNEY

Patented Nov. 12, 1935

2,020,807

UNITED STATES PATENT OFFICE 2,020,807

ELECTRIC ROTISSERIE

William G. Speakman, Port Washington, N. Y., assignor of two-fifths to The Inventions Exploitation Corporation, New York, N. Y., a corporation of Delaware, and one-fifth to Gaetano Prendini, Port Washington, N. Y.

Application May 19, 1932, Serial No. 612,290

4 Claims. (Cl. 219—35)

This invention relates to electric ovens in small units for household cooking and more particularly to such devices adapted to roasting chicken, beef, etc. after the "rotisserie" manner.

The objects of this invention, among others, are: First, to provide a small portable electric oven for roasting meat, the meat being roasted while mounted on a rotatable spit; second, to provide a swinging side door that supports the spit; third, to provide means for raising the spit to the upper or hotter part of the oven or lowering it into the drip pan for basting; fourth, to provide a movable mounting for the electrical heating coils to permit free access for cleaning; fifth, to provide a transparent window of heat-resisting material; sixth, to provide a heat-insulating oven; and seventh, to provide a forwardly and upwardly inclined roof and a bank of heating coils the face of which is at right angles thereto with the objective of enhancing the speed of roasting. Other objects will appear as the description proceeds.

An oven for roasting meat in which the roast is mounted on a spit over a fire is ordinarily called a "rotisserie", which arrangement is embodied in this invention, in which electrical heating coils mounted in the form of an inclined wall throw heat rays outwardly and upwardly. The low rearwardly inclined roof tends to concentrate the heated air and vapors at the top of the oven and so increase the rate of cooking on this part of the roast. By turning the handle on the hinged door the spit and the roast mounted thereon are turned toward or away from the heating coils and by raising the lever which carries the handle and the spit, the roast is raised into the hotter part of the oven, or by lowering this lever the roast is lowered into the drip pan where it is easily basted by turning the handle. By making the device of a size sufficient to accommodate a chicken or moderate-sized roast and having the walls insulated, this device produces the cooking effect of both the electrical resistance coil heat radiation and the ordinary heated oven, thereby roasting the meat in a shorter time and with a more delightful and palatable flavor. Roasting a chicken in this device gives the combination of the searing effect on that part of the roast in proximity to the heating coils and of the ordinary oven effect in the small closed compartment with a sealed atmosphere saturated with the vapors from the roast. A test made of this device shows that to roast a three and a half pound chicken requires only thirty-five minutes and at the average house rates for electricity costs about three cents, using in all about 600 watt-hours.

Figure 2:
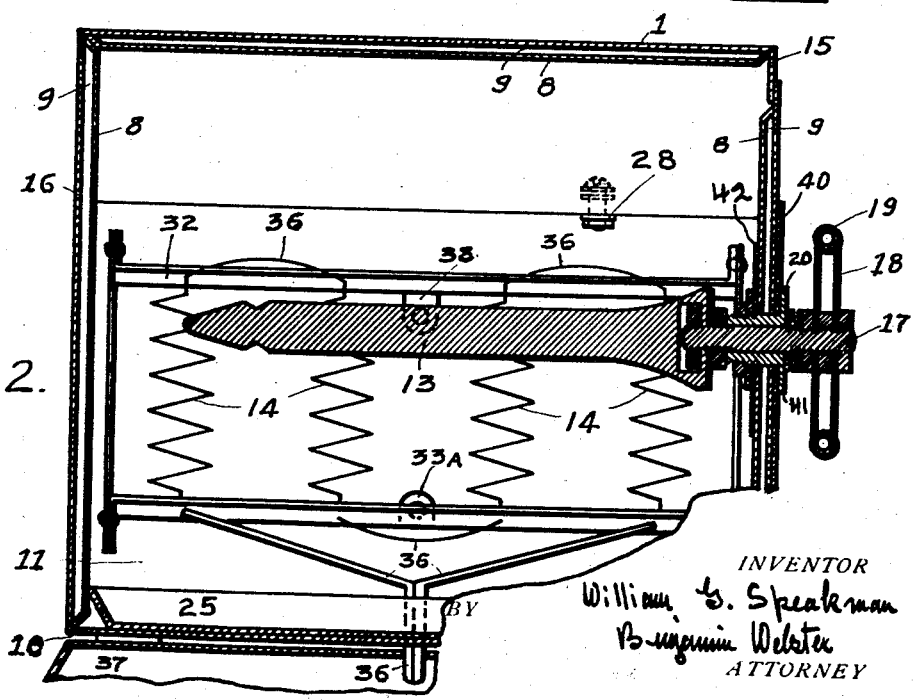
Figure 3:
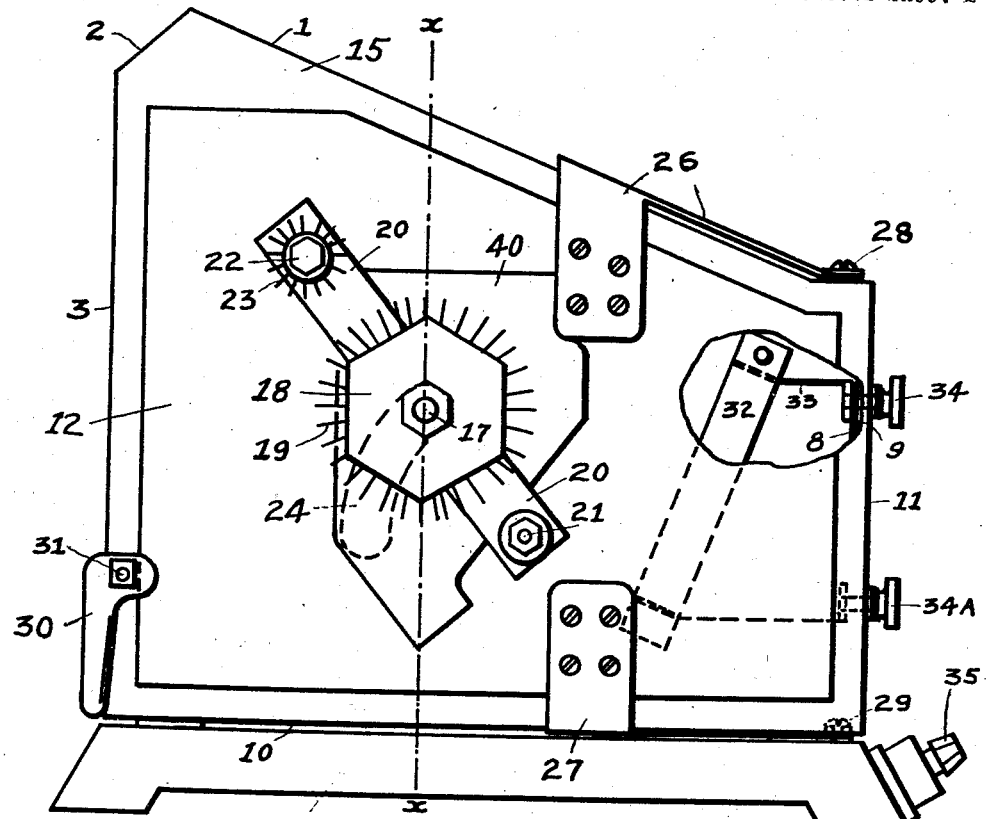
Figure 5:
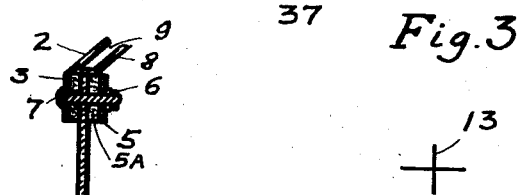
Figure 4:
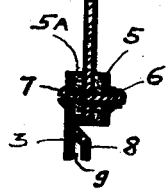

Reference is made to the drawings for illustration of one embodiment of the invention in which Fig. 1 is a front elevation, Fig. 2 is a transverse section on the line x—x of Fig. 3, Fig. 3 is a right end elevation, Fig. 4 is a vertical section through the front of the oven on the line y—y of Fig. 1, and Fig. 5 indicates the spit viewed from the end.

The oven 1 is of such a size as to accommodate easily a chicken or small roast. The top or roof of the oven slopes forwardly and upwardly and near the front is turned forwardly and downwardly to form the front of the roof 2. The objective of this construction is to provide the cubical space of the oven for heated air and vapors proximate to and effective on the roast. The front 3 supports a transparent window 4 of heat-resisting material such as "pyrex" which gives visibility of the roast in the oven. For increased visibility other windows may be added and electric lights placed near them in such a way as to illuminate the interior, a feature that is desired where the device is used at a road stand. Around and on both sides of the window 4 are strips of asbestos 5 and 5A and this assembly is secured in position by the screw bolts 7 and the nuts 6, as clearly shown in Fig. 4. Paralleling the outer walls of the oven is an inner wall 8 adapted to provide a space 9 therebetween. This space 9 may be designated as a heat-resisting or heat-insulating space and may also contain a more positive heat-insulating means such as asbestos. On the bottom a space similar to 9 is provided by offsetting the bottom 10 of the oven from the top of the supporting base 37 by means of tongues 39 to which the bottom 10 is secured by bolts 38. It will be noted that the back 11 of the oven is considerably less in height than the front 3.

The right side 15 of the oven 1 comprises a door 12 which is substantially coextensive with the side of the oven thereby affording facile access. Rotatably mounted in the door 12 is the spit 13 which in the operative position shown in Fig. 2 parallels the face of the electrical heating resistance coils 14. It is obvious that if desired the door 12 might also be mounted in the left wall 16 of the oven. A bolt 17 supports round handle 18 on the outer end, carrying a circumferential row of wire loops 19 and being secured thereto by lock nuts, and on the inner end the spit 13 also secured by lock nuts. The bolt 17 has a rotatable bearing in a tubular member 41 which is secured to the bar or lever 20, the latter being pivotally mounted at the lower end in the bolt 21 secured on the outside of the door. At the upper end the bar 20 is looped outwardly to form an offset parallel extension on which by means of the bolt 22 is mounted the small wire-loop handle 23. An arcuate slot 24 in the door 12 permits of an oscillatory motion of the bar 20 to raise or to lower the spit 13. An outer shield 40 and an inner shield 42 overlie the slot 24 at all times thereby preventing the exit of heated air or vapor from the oven, and also exert the needed frictional pressure on the sides of the door 12 to support the spit 13 in any adjusted position. The friction is adjusted by suitable nuts on the tubular member 41. The usual drip pan 25 is placed on the floor of the oven beneath the spit 13. An upper hinge 26 and a lower hinge 27 are secured respectively by bolts 28 and 29, to the top and bottom of the back 11 of the oven, at points inset or removed from the right end. That is, the effective hinge axis is in a line to the rear of the back 11 so that as the door 12 is swung open the point of the spit swings in a curved line well removed from the edge of the wall 15 bordering on the door. The frame 32 is inclined to the rear so that a perpendicular therefrom is substantially parallel with the inclined roof and is mounted on the brackets 33 and 33A which are detachably secured to the rear wall by thumb nuts 34 and 34A. A switch 35 is mounted at the rear and is connected with insulated conductors 36 which are attached to the terminals of the electrical resistance wires 14.

Having described and illustrated one embodiment of my invention, and realizing that in view of my disclosure many modifications will occur to those skilled in the art but within the spirit and scope of my invention, I do not choose to limit myself except as in the appended claims.

I claim:

1. A combined oven and rotisserie comprising in combination, a container, heating units in the rear thereof, an electrical conductor connected therewith and extending through said container, a door in a side wall of said container, supports secured to said door and pivotally mounted on the rear of said container between the sides thereof, a spit rotatably mounted in said door and adapted when said door is closed to lie in a position in front of and parallel to said heating units, and means for rotating the spit.

2. A combined oven and rotisserie comprising in combination, a container, the roof of said container being elevated at the front and inclined downwardly to the rear, an electrical heating unit in the rear of the container and so arranged that the effective radiation therefrom is forwardly and upwardly, an electric switch connected therewith and mounted outside the container, a door in said container and vertically mounted to swing outwardly, a spit rotatably mounted in said door and adapted when said door is closed to lie in a position in front of and parallel to said heating unit, and means for rotating the spit.

3. A combined oven and rotisserie comprising in combination, a container, the roof of said container being elevated at the front and inclined downwardly to the rear, an electrical heating unit in the rear thereof, the face of said unit being inclined backwardly from the bottom, said unit being removably mounted in the container, a transparent window of heat-resisting material in the wall of said container, an electric switch connected therewith and mounted outside the container, a door in said container and vertically mounted to swing outwardly, a spit rotatably mounted in said door and adapted when said door is closed to lie in a position in front of and parallel to said heating unit, and means for rotating the spit.

4. A combined oven and rotisserie comprising in combination, a container, a heating unit in the rear thereof, an electrical conductor connected therewith and extending through said container, a door in said container and adapted to swing outwardly, a spit rotatably mounted in said door and adapted when said door is closed to lie in a position in front of and parallel to said heating unit, a handle for rotating the spit, and a bar pivotally mounted on the door and on which the spit is mounted for raising or lowering the handle and said spit.

WILLIAM G. SPEAKMAN.